(12) United States Patent
Cho et al.

(10) Patent No.: US 8,760,764 B2
(45) Date of Patent: Jun. 24, 2014

(54) REGULAR PATTERN OPTICAL SHEET

(75) Inventors: Suhyeon Cho, Seoul (KR); Sangbum Lee, Seoul (KR); Hyunjoon Kim, Seoul (KR); Wooyoung Chang, Seoul (KR); Woong Hwang, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 112 days.

(21) Appl. No.: 13/384,320

(22) PCT Filed: Jul. 16, 2010

(86) PCT No.: PCT/KR2010/004636
§ 371 (c)(1),
(2), (4) Date: Jan. 16, 2012

(87) PCT Pub. No.: WO2011/008044
PCT Pub. Date: Jan. 20, 2011

(65) Prior Publication Data
US 2012/0113531 A1 May 10, 2012

(30) Foreign Application Priority Data
Jul. 16, 2009 (KR) .................. 10-2009-0064735

(51) Int. Cl.
*G02B 3/00* (2006.01)
(52) U.S. Cl.
CPC .................. *G02B 3/0056* (2013.01)
USPC ........................................... 359/620
(58) Field of Classification Search
CPC .................................................. G02B 3/0056
USPC .................................. 359/619, 620
See application file for complete search history.

(56) References Cited

U.S. PATENT DOCUMENTS

| 7,280,278 B2 * | 10/2007 | Boettiger et al. ............. 359/619 |
| 7,333,268 B2 * | 2/2008 | Steenblik et al. ............. 359/619 |
| 2011/0149177 A1 * | 6/2011 | Takata ........................ 359/599 |

FOREIGN PATENT DOCUMENTS

| JP | 07-333406 A | 12/1995 |
| JP | 2004-145329 A | 5/2004 |
| JP | 2004-309801 A | 11/2004 |
| TW | 2008-48787 A | 12/2008 |
| WO | WO-2009/028226 A1 | 3/2009 |

OTHER PUBLICATIONS

International Search Report in International Application No. PCT/KR2010/004636, filed Jul. 16, 2010.
Office Action dated Apr. 19, 2013 in Japanese Application No. 2012-520545, filed Jul. 16, 2010.
Office Action dated Mar. 11, 2014 in Chinese Application No. 2010-80041197.3.

* cited by examiner

*Primary Examiner* — Zachary Wilkes
(74) *Attorney, Agent, or Firm* — Saliwanchik, Lloyd & Eisenschenk

(57) ABSTRACT

The present invention relates to a regular pattern optical sheet, the sheet including a transparent flat plate-shaped body, and a plurality of lens-shaped patterns regularly formed at one surface of the body, each having a same size of more than 0.1 μm but smaller than 25 μm in diameter, an angle formed by at least one line of lines straightly connecting each center of the plurality of lens-shaped patterns, wherein a horizontal axis of an LCD pixel formed at an upper surface of the body is more than 5.5° but smaller than 9.5°, and a discrete distance between the plurality of lens-shaped patterns is more than 5% but smaller than 15% of a diameter of the lens-shaped pattern.

1 Claim, 3 Drawing Sheets

610 ial sheet capable of accomplishing a high luminance characteristic, unlike the conventional irregular lens pattern, to accomplish a low power consumption and environment-friendliness, and of being applicable to various patterns to cater to a user demand characteristic by enabling a characteristic adjustment due to regular pattern application capable of optical control.

REGULAR PATTERN OPTICAL SHEET

CROSS-REFERENCE TO RELATED APPLICATION

This application is the U.S. national stage application of International Patent Application No. PCT/KR2010/004636, filed Jul. 16, 2010, which claims priority to Korean Application No. 10-2009-0064735, filed Jul. 16, 2009, the disclosures of each of which are incorporated herein by reference in their entirety.

TECHNICAL FIELD

The present invention relates to a regular pattern optical sheet capable of accomplishing a high luminance characteristic, unlike the conventional irregular lens pattern, to accomplish a low power consumption and environment-friendliness, and of being applicable to various patterns to cater to a user demand characteristic by enabling a characteristic adjustment due to regular pattern application capable of optical control.

BACKGROUND ART

As the information age progresses, display devices visually displaying a large amount of data on the basis of an electric signal are being rapidly developed. As a result, flat panel display devices with superior features such as light weight, slimness, and low electric power consumption have been widely distributed. Flat panel display devices include liquid crystal display (LCD) devices, plasma display panel (PDP) devices, field emission display (FED) devices, organic electro luminescence display (OELD) devices, and so on. A cathode ray tubes of related art are rapidly being replaced with flat display devices. Many researches are being waged to improve the display quality of the flat display devices. Particularly, the LCD has gradually improved from disadvantages of high power consumption and viewing angle area that have been raised as drawbacks of LCD.

Unlike other display devices such as a Cathode Ray Tube (CRT), and a Plasma Display Panel (PDP), a liquid crystal display panel used in an LCD cannot generate light by itself. Therefore, an LCD requires a separate light source which can provide the liquid display panel with light and a backlight unit including the light source. That is, since the liquid crystal layer is not self-emissive, the LCD module also has a backlight assembly, which is located behind the TFT panel, to provide light to the liquid crystal layer.

The backlight assembly includes a mold frame formed with an accommodating space, a reflective sheet disposed at a base surface of the accommodating space to reflect light toward liquid display panels, a light guide plate formed at an upper surface of the reflective sheet to guide the light, a lamp unit formed between the light guide plate and a lateral surface of the accommodating space to emit the light, an optical sheets stacked on the upper surface of the light guide plate to diffuse and collect the light, and a top chassis formed at an upper surface of the mold frame to cover an area from a predetermined corner position of the liquid crystal panel to a lateral surface of the mold frame.

The optical sheet includes diffusion sheets for diffusing light, prism sheets stacked on an upper surface of the diffusing sheet to collect the diffused light and to transmit the collected light to the liquid crystal panels, and a protective sheet configured to protect the diffusing sheets and the prism sheets.

Particularly, configuration of optical sheets is highlighted for implementing improvement of luminance, low power consumption and slimness which are the trends of current LCD televisions. To this end, the reduced number of lamps and backlight unit of LED have been introduced, and effect of diffusing function and luminance improvement is greatly required from the optical sheets of the backlight unit.

Currently, the technique to simultaneously satisfy the improvement of luminance and diffusing function is a method of irregularly distributing lens-shaped patterns on the optical sheets. FIG. 1 is a plan view illustrating an optical sheet formed with irregular patterns according to prior art.

Referring to FIG. 1, lens-shaped patterns irregularly formed on ultraviolet resin are seen. The irregular pattern arrangement still suffers from dissatisfaction resulting from such characteristics as low power consumption, poor luminance and poor diffusion of LCD despite recent development of improved luminance and diffusion function. The reason is that it is difficult to control the optical characteristic because the arrangement is irregular based on the pattern sizes. To be more specific, it is difficult to control the packing factor and sag (lens height/lens diameter) of lens, which are the most important factors for determining the characteristics of luminance and diffusibility.

Therefore, it is necessary to require an arrangement of regular patterns for improving the characteristics of luminance and diffusion. However, the use of regular patterns may cause an occurrence of a Moire pattern beating due to repeated periodicity with LCD panels. Moreover, the Moire pattern beating may cause reduction of luminance and unbalanced screen image, which may act as a limitation to application of regular patterns.

As a result, optical sheets having regular patterns are required in earnest in order to control the packing factor and sag of lens, and to prevent the Moire pattern beating as well.

And, light bulbs such as fluorescent lamp, incancescent lamp was used as a light source at home. So quality of light is not good and dazzling is brought about because the light bulbs are driven by commonly used alternating current frequency, which cause user's eye to be tired. To reduce the aforementioned disadvantage, optical sheet which can improve a luminance of light bulbs and reduce the eye-tiredness and prevent a amblyopia by being positioned at the light outlet, is required.

DISCLOSURE OF INVENTION

Technical Problem

The present invention is disclosed to solve the aforementioned disadvantages, and it is an object of the present invention to provide a regular pattern optical sheet configured to enable an optical control through regular pattern application and to improve functions of power consumption, environment-friendliness and slimness that have no Moire pattern beating.

Technical problems to be solved by the present invention are not restricted to the above-mentioned, and any other technical problems not mentioned so far will be clearly appreciated from the following description by skilled in the art.

Solution to Problem

An object of the invention is to solve at least one or more of the above problems and/or disadvantages in a whole or in part and to provide at least the advantages described hereinafter. In order to achieve at least the above objects, in whole or in part, and in accordance with the purposes of the invention, as embodied and broadly described, and in one general aspect of the present invention, there is provided a regular pattern optical sheet, comprising: a transparent flat plate-shaped body; and a plurality of lens-shaped patterns regularly formed at one surface of the body, each having a same size of more than 0.1 μm but smaller than 25 μm in diameter, whereby adjustment of lens size can improve the luminance without occurrence of Moire pattern beating.

In another general aspect of the present invention, there is provided a regular pattern optical sheet, comprising: a transparent flat plate-shaped body; and a plurality of lens-shaped patterns regularly formed at one surface of the body, each having a same size, wherein an angle formed by at least one line of lines straightly connecting each center of the plurality of lens-shaped patterns and a horizontal axis of an LCD pixel formed at an upper surface of the body is more than 5.5° but smaller than 9.5°, and whereby adjustment of lens pattern arrangement can improve the luminance without occurrence of Moire pattern beating.

In still another general aspect of the present invention, there is provided a regular pattern optical sheet, comprising: a transparent flat plate-shaped body; and a plurality of lens-shaped patterns regularly formed at one surface of the body, each having a same size, wherein a discrete distance between the plurality of lens-shaped patterns is more than 5% but smaller than 15% of a diameter of the lens-shaped pattern, and whereby adjustment of discrete distance between the lens-shaped patterns can improve luminance without occurrence of Moire pattern beating.

In some exemplary embodiments of the present invention, a ratio of height to diameter of the lens-shaped pattern (lens height/lens diameter) is more than 0.3 but less than 0.6, or an area formed by the plurality of lens-shaped patterns is more than 70% but less than 95% of an area of body, whereby the lens packing factor and sag can be adjusted to control the luminance and diffusibility.

In still further aspect of the present invention, there is provided a regular pattern optical sheet, comprising: a transparent flat plate-shaped body; and a plurality of lens-shaped patterns regularly formed at one surface of the body, each having a same size of more than 0.1 μm but smaller than 25 μm in diameter, wherein an angle formed by at least one line of lines straightly connecting each center of the plurality of lens-shaped patterns and a horizontal axis of an LCD pixel formed at an upper surface of the body is more than 5.5° but smaller than 9.5°, and a discrete distance between the plurality of lens-shaped patterns is more than 5% but smaller than 15% of a diameter of the lens-shaped pattern, and whereby lens size, lens pattern arrangement and discrete distance between lens patterns can be adjusted to improve the luminance without occurrence of Moire pattern beating.

In some exemplary embodiments of the present invention, a ratio of height to diameter of the lens-shaped pattern (lens height/lens diameter) is more than 0.3 but less than 0.6, and an area formed by the plurality of lens-shaped patterns is more than 70% but less than 95% of an area of the body, whereby the lens packing factor and sag can be adjusted to control the luminance and diffusibility.

Advantageous Effects of Invention

The regular pattern optical sheet according to the present invention have advantageous effects in that a high luminance characteristic can be accomplished over the conventional irregular lens pattern arrangement to the betterment of power consumption and environment friendliness. Furthermore, characteristic adjustment is enabled by regular pattern application capable of optical control to cater to various requirements of a user without occurrence of Moire pattern beating.

BEST MODE FOR CARRYING OUT THE INVENTION

Figure 1:
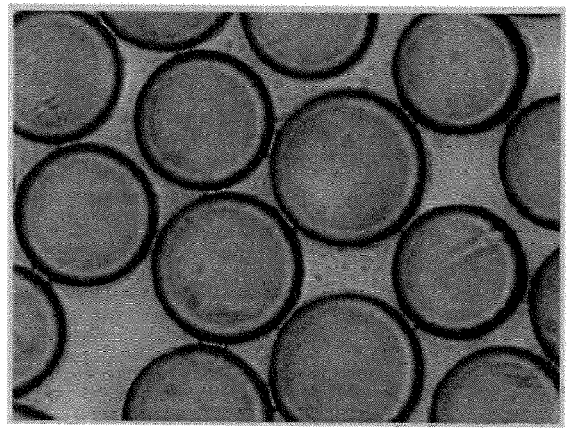
FIG. 1 is a plan view illustrating an optical sheet formed with irregular patterns according to prior art.

Now, a regular pattern optical sheet according to the present invention will be described in detail with reference to the accompanying drawings. The disclosed embodiments and advantages thereof are best understood by referring to FIGS. 1-6 of the drawings.

In describing the present invention, detailed descriptions of constructions, configurations or processes known in the art may be omitted to avoid obscuring appreciation of the invention by a person of ordinary skill in the art with unnecessary detail regarding such known constructions and functions. In the drawings, the size and relative sizes of each element may be exaggerated for clarity and are not applied to practical applications. Like reference numerals in the drawings denote like elements. It will be understood that when an element such as a layer, film, region, or substrate is referred to as being "on" or "under" another element, it can be directly on, or directly connected to the other element, or intervening elements may be present. The "on" or "under" of each element is based on the drawings. Also, "exemplary" is merely meant to mean an example, rather than the best.

Figure 2:
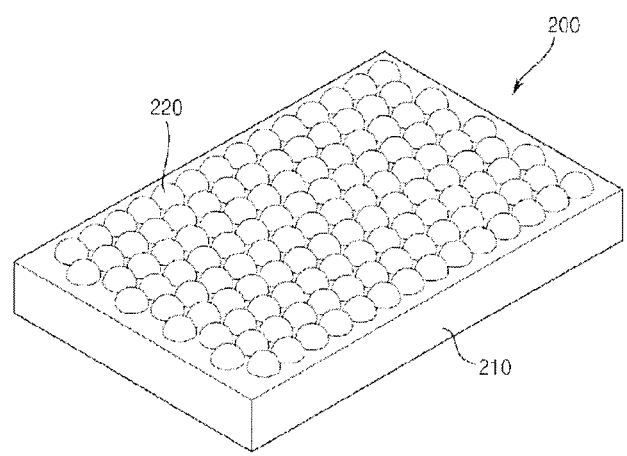
FIG. 2 is a perspective view illustrating an exterior look of a regular pattern optical sheet according to an exemplary embodiment of the present invention.

FIG. 2 is a perspective view illustrating an exterior look of a regular pattern optical sheet according to an exemplary embodiment of the present invention.

A regular pattern optical sheet (200) may include a transparent flat plate-shaped body (210); and a plurality of lens-shaped patterns (220) regularly formed at one surface of the body (210), each having a same size. Conventionally, in a case lens-shaped patterns are regularly arranged, Moire pattern, which is an interference pattern produced by overlaying similar but slightly offset templates, is generated due to LCD pixels formed on the optical sheet and periodicity of regular pattern shape. However, the regular pattern optical sheet according to the present invention can remove the Moire patterns in the following three methods.

MODE FOR THE INVENTION

A first method is to adjust the size of the lens-shaped patterns (220) that are illustrated in FIG. 2. To be more specific, a diameter of each lens-shaped pattern (220) is reduced to smaller than 25 μm. More preferably, a diameter of each lens-shaped pattern (220) is made to be more than 0.1 μm but smaller than 25 μm. The Moire pattern beating that is improved through adjustment of size of the plurality of lens-shaped patterns (220) may be ascertained in FIG. 3.

Figure 3:
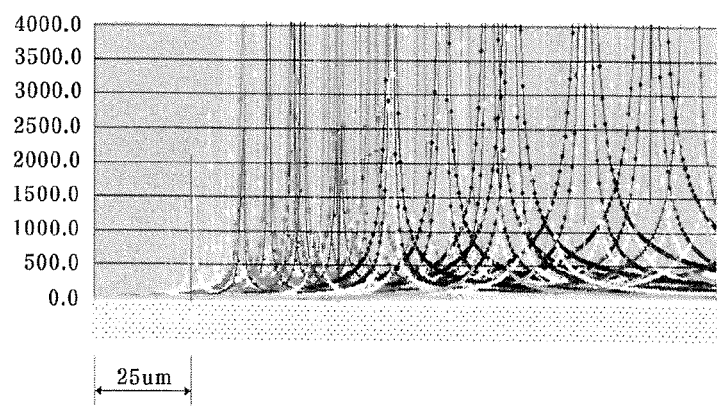
FIG. 3 is a graph illustrating Moire pattern beating based on various series of LCD pixels relative to regular lens-shaped patterns each having a diameter of less than 25 μm according to an exemplary embodiment of the present invention.

FIG. 3 is a graph illustrating Moire pattern beating based on various series of LCD pixels relative to regular lens-shaped patterns, each having a diameter of smaller than 25 μm according to an exemplary embodiment of the present invention, where the vertical axis shows a light intensity while the horizontal axis defines a diameter of the lens-shaped patterns, each of which increases as it heads the right hand side.

Referring to FIG. 3, in a case the diameter of the lens-shaped pattern is made smaller than 25 μm, it can be noted that the fluctuation range in the light intensity is less than 1500.0 to the maximum, which shows that the Moire pattern beating has been remarkably improved over that of other sizes.

Figure 4:
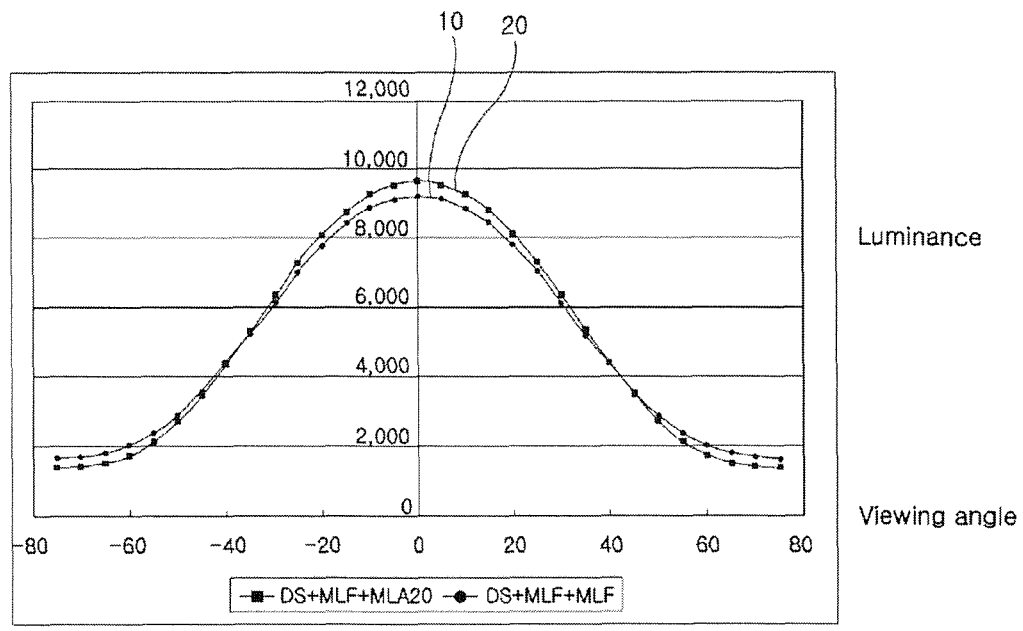
FIG. 4 is a graph illustrating an improved luminance of a regular lens-shaped pattern having a diameter of less than 25 μm over the prior art irregular lens-shaped pattern according to an exemplary embodiment of the present invention.

FIG. 4 is a graph illustrating an improved luminance of a regular lens-shaped pattern having a diameter of smaller than 25 μm over the prior art irregular lens-shaped pattern according to an exemplary embodiment of the present invention, where a line (20) defines luminance of a regular lens-shaped pattern having a diameter smaller than 25 μm, and a horizontal axis means a viewing angle.

Referring to FIG. 4, in a case the viewing angle is 0 degree, that is, in a case the LCD flat surface is viewed right from the top, it can be noticed that the luminance has been improved approximately 5% over that of the optical sheet having the conventional regular patterns.

A second method of removing the Moire pattern beating is to arrange the lens-shaped patterns in such a manner that lens period deviate from the LCD pixels.

Figure 5:
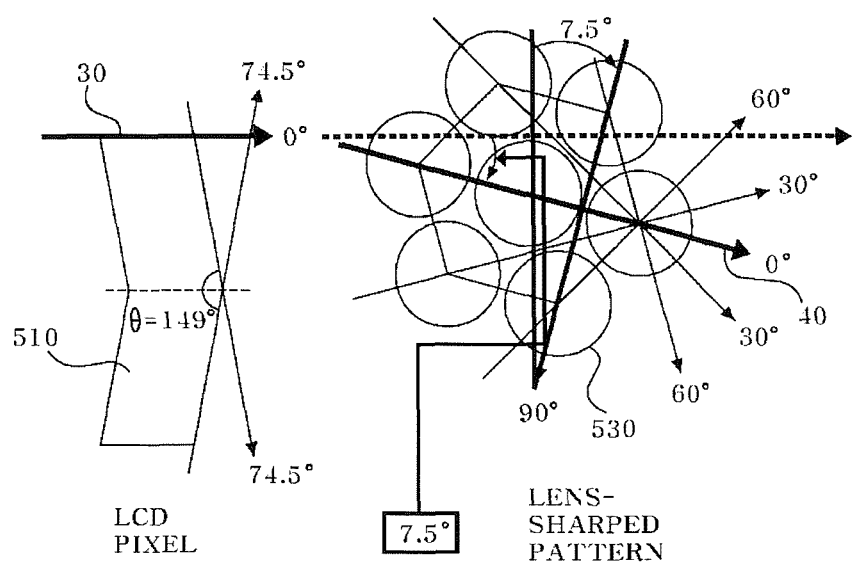
FIG. 5 is a plan view illustrating a lens-shaped pattern period inclined against LCD pixel according to an exemplary embodiment of the present invention.

FIG. 5 is a plan view illustrating a lens-shaped pattern period inclined against LCD pixel according to an exemplary embodiment of the present invention.

It should be understood that although the present invention has illustrated IPS type of LCD pixel (510) as LCD pixel, the present invention is not limited thereto. At this time, an inner angle θ of the IPS type LCD pixel (510) is preferably 149°. In this case, the Moire pattern beating can be removed by inclining at least one line (40. hereinafter referred to as 'reference line') of lines straightly connecting each center of lens-shaped patterns (530) by 7.5°±2° against a horizontal axis (30) of LCD pixel (510), i.e., inclining the at least one line greater than 5.5° but less than 9.5°.

Figure 6:
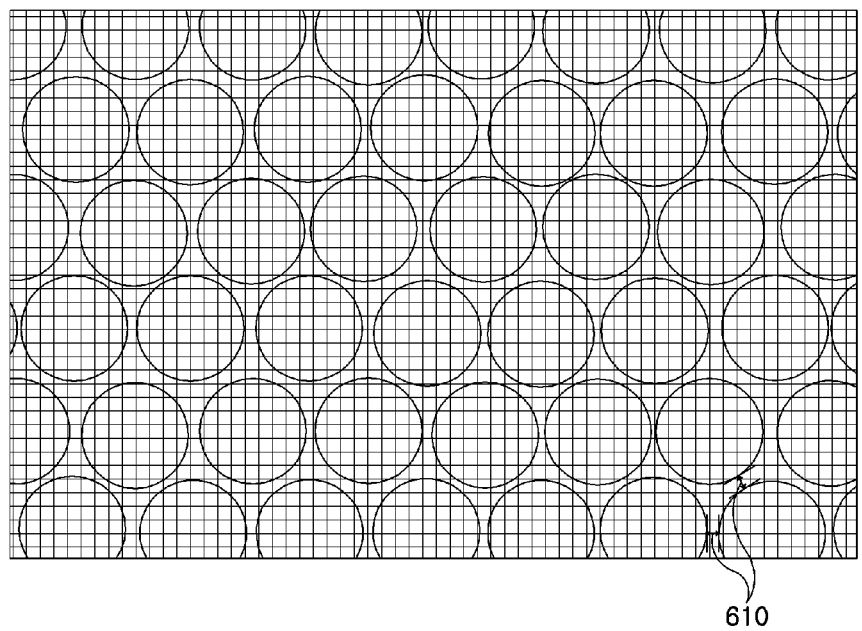
FIG. 6 is a plan view illustrating an optical sheet that constantly maintains a discrete distance between lens-shaped patterns according to an exemplary embodiment of the present invention.

At this time, as illustrated in FIG. 6, the reference line (40) is such that a line horizontally connecting each center of the lens-shaped patterns is parallel to the horizontal axis of a body of the optical sheet, if the regularly arranged lens-shaped pattern is not inclined. The horizontal axis of the body is generally parallel to a horizontal axis of the LCD pixel formed at an upper surface of the optical sheet. Therefore, in a case the horizontal line of the lens-shaped pattern is slanted from the horizontal axis of the body, the horizontal axis of the LCD pixel which is parallel to the horizontal axis of the body forms an inclination angle.

Furthermore, as illustrated in FIG. 5, in order to increase the packing factor of the lens-shaped patterns (530), it is preferable that lines connecting the centers of ambient lenses surrounding each lens are made to form a regular hexagon. The angle of period where the lens-shaped patterns are regularly arranged in the hexagonal structure is 0°, 30°, 60° and 90° against the reference line (40) of the lens-shaped pattern.

A third method of removing the Moire pattern beating is to constantly maintain each discreted distance of the lens-shaped patterns.

FIG. 6 is a plan view illustrating an optical sheet that constantly maintains a discrete distance between lens-shaped patterns according to an exemplary embodiment of the present invention.

Referring to FIG. 6, the discrete distance among the lens-shaped patterns is preferably more than 5% but less than 15% based on the diameter of the lens-shaped pattern. In this case, the periodicity of the lens-shaped patterns which is the most important factor creating the Moire pattern beating may be changed.

Still furthermore, in all the aforementioned three methods of removing the Moire pattern beating, adjustment of packing factor and sag of the lens-shaped patterns may control the luminance and diffusivity which have been regarded as being impossible to control in the conventional irregular patterned optical sheet.

For example, in all of the aforementioned three methods of removing Moire pattern beating, luminance can be improved by making the packing factor greater than 70% but less than 95%, that is, by making an area formed by the plurality of lens-shaped patterns more than 70% but less than 95% of an area of the body. Alternatively, the luminance can be improved by maintaining the sag of lens greater than 0.3 but less than 0.6. Furthermore, a simultaneous adjustment of the packing factor and the sag can also improve the luminance.

INDUSTRIAL APPLICABILITY

The regular pattern optical sheet according to the present invention have industrial applicability in that a high luminance characteristic can be accomplished over the conventional irregular lens pattern arrangement to the betterment of power consumption and environment friendliness. Furthermore, characteristic adjustment is enabled by regular pattern application capable of optical control to cater to various requirements of a user without occurrence of Moire pattern beating.

Although the present invention has been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

The invention claimed is:
1. A regular pattern optical sheet, comprising:
a transparent flat plate-shaped body; and
a plurality of lens-shaped patterns regularly formed at one surface of the body, each having a same size of more than 5 μm but smaller than 25 μm in diameter,
wherein an angle formed by at least one line of straightly connecting each center of the plurality of lens-shaped patterns and a horizontal axis of an LCD pixel formed at an upper surface of the body is more than 5.5° but smaller than 9.5°,
wherein a discrete distance between the plurality of lens-shaped patterns is more than 5% but smaller than 15% of a diameter of the lens-shaped pattern,
wherein a ratio of height to diameter of the lens-shaped pattern (lens height/lens diameter) is more than 0.3 but less than 0.6, and wherein an area formed by the plurality of lens-shaped patterns is more than 70% but less than 95% of an area of the body.

* * * * *